United States Patent
Luttrell

(10) Patent No.: US 9,405,690 B2
(45) Date of Patent: Aug. 2, 2016

(54) METHOD FOR STORING MODIFIED INSTRUCTION DATA IN A SHARED CACHE

(71) Applicant: Oracle International Corporation, Redwood City, CA (US)

(72) Inventor: Mark A Luttrell, Cedar Park, TX (US)

(73) Assignee: Oracle International Corporation, Redwood Shores, CA (US)

(*) Notice: Subject to any disclaimer, the term of this patent is extended or adjusted under 35 U.S.C. 154(b) by 257 days.

(21) Appl. No.: 13/961,417

(22) Filed: Aug. 7, 2013

(65) Prior Publication Data
US 2015/0046651 A1     Feb. 12, 2015

(51) Int. Cl.
*G06F 12/08* (2016.01)

(52) U.S. Cl.
CPC .......... *G06F 12/084* (2013.01); *G06F 12/0811* (2013.01); *G06F 12/0864* (2013.01)

(58) Field of Classification Search
CPC . G06F 9/3844; G06F 12/0848; G06F 9/3802; G06F 9/3842; G06F 12/0811; G06F 12/0862; G06F 9/3861; G06F 12/0808; G06F 12/0815; G06F 12/0895; G06F 12/121; G06F 2212/1016; G06F 2212/1028; G06F 11/3612; G06F 12/0897; G06F 12/0891; G06F 1/3275; G06F 9/30043; G06F 9/30185; G06F 9/3834
USPC ......... 711/125, 133, 122, 141, 144, 123, 145, 711/3, E12.046, 118, E12.017, E12.024, 711/E12.043, E12.052, 159, E12.022, 129, 711/130, E12.026, E12.042, E12.069, 135
See application file for complete search history.

(56) References Cited

U.S. PATENT DOCUMENTS

| | | | |
|---|---|---|---|
| 5,168,560 A * | 12/1992 | Robinson et al. ............. 711/123 |
| 5,669,011 A | 9/1997 | Alpert et al. |
| 5,689,679 A * | 11/1997 | Jouppi .......................... 711/122 |
| 6,199,154 B1 * | 3/2001 | Witt ..................... G06F 9/30021 711/122 |
| 6,892,173 B1 * | 5/2005 | Gaither ............... G06F 12/0802 703/20 |
| 7,802,055 B2 | 9/2010 | Sartorius et al. |
| 2002/0112129 A1 * | 8/2002 | Arimilli ............. G06F 12/0848 711/141 |
| 2002/0199070 A1 * | 12/2002 | Chaudhry et al. ............ 711/147 |
| 2003/0163677 A1 * | 8/2003 | Augsburg ............... G06F 9/322 712/233 |
| 2008/0147990 A1 * | 6/2008 | Pesavento ........... G06F 12/0895 711/145 |
| 2009/0300293 A1 * | 12/2009 | Mantor et al. ................ 711/141 |

FOREIGN PATENT DOCUMENTS

| EP | 0271187 | 12/1995 |
|---|---|---|
| EP | 0798632 | 9/2002 |

* cited by examiner

*Primary Examiner* — Tuan Thai
*Assistant Examiner* — Edward Waddy, Jr.
(74) *Attorney, Agent, or Firm* — Meyertons Hood Kivlin Kowert & Goetzel

(57) ABSTRACT

A processor may include a cache configured to store instructions and memory data for the processor. The cache may store instructions in which a relative address, such as for a branch instruction has been calculated, such that the instruction stored in the cache is modified from how the instruction is stored in main memory. The cache may include additional information in the tag to identify an instruction entry versus a memory data entry. When receiving a cache request, the cache may look at a type tag in addition to an address tag to determine if the request is a hit or a miss based upon the request being for an instruction from an instruction fetch unit or for memory data from a memory management unit. A cache entry may be invalidated and evicted if the address matches but the data type does not match.

20 Claims, 6 Drawing Sheets

METHOD FOR STORING MODIFIED INSTRUCTION DATA IN A SHARED CACHE

BACKGROUND

1. Field of the Invention

This invention relates to processors and, more particularly, to implementation of cache memory systems.

2. Description of the Related Art

To improve execution performance, processors may include one or more levels of cache memories (commonly referred to as "caches"). A cache may be used to store frequently accessed instructions and/or memory data, and improve performance by reducing the time for the processor to retrieve these instructions and data. A processor may include a fast first-level (L1) cache backed by a larger, slower second-level (L2) cache. Some processors may include a third-level (L3) cache for further performance improvement.

In some multicore processors and some single-core processors with multiple bus masters, the L2 and/or L3 caches may be shared. This sharing requires coherency mechanisms to ensure that cached memory being accessed by one cache user has not been modified by another cache user. In various computing systems, different coherency protocols, such as, e,g, Modified-Owned-Exclusive-Shared-Invalid (MOESI), Modified-Exclusive-Shared-Invalid (MESI), or any other suitable coherency protocol, may be employed.

An entry in a cache may be referred to as a cache line. Each cache line in a cache may include the data being stored, flags corresponding to the coherency state, and an address tag. A cache tag may include all or a part of the original address of the data being stored in the cache line, an index indicating in which cache line the cached data is stored, and an offset indicating where in each cache line the specific data is located. A processor may access a cache with a direct address of the memory location, a translated address based on lookup tables, or through an address calculated based on an instruction's address mode.

Instruction Set Architectures (ISAs) may include multiple addressing modes. One common addressing mode is a relative offset mode. In a relative offset mode, the address is calculated by adding a signed number to the current program address (referred to in various embodiments as program counter, instruction pointer, instruction address register or instruction counter). An instruction with this type of addressing mode may require the processor to utilize clock cycles to calculate the address every time the instruction is executed.

SUMMARY

Various embodiments of systems and methods for improving system performance through the use of cached information in a processor are disclosed. In one embodiment, a system may include, one or more processor cores, a high-level memory configured to store program instructions and memory data and a cache memory, coupled to the high-level memory and to the one or more processor cores, configured to process requests for program instructions and memory data for the one or more processor cores. The cache memory may include multiple cache lines configured to store program instructions or memory data and a tag for each cache line configured to store information corresponding to the respective cache line. The cache memory may be further configured to receive a request from one of the processor cores for an instruction at a given address and determine if the instruction at the given address has been stored in a cache line. If the cache memory determines the instruction at the given address is not stored in a cache line, then the cache memory may retrieve the instruction from the high-level memory and store it in a given cache line. The cache memory may also be configured to set a data type tag for the stored instruction indicating the data stored in the associated cache line is an instruction. The cache memory may receive another request from one of the processor cores for non-instruction data at the given address and, based on the data type tag, determine the data stored in the given cache line associated with the given address is an instruction. Upon this determination, the cache memory may invalidate the given cache line, retrieve the non-instruction data at the given address from the high-level memory, store the received non-instruction data in a given cache line and set a type tag indicating the data is non-instruction data.

In another embodiment, the cache memory may be further configured to modify an operand of the retrieved instruction by computing a target address for a relative-offset address type instruction.

In a separate embodiment, the cache memory, in response to invalidating the given cache line, may be further configured to evict the data from the given cache line and to send an eviction notice to the higher-level memory. In a further embodiment, the cache memory may be further configured to send an eviction notice to one or more processor cores in response to evicting the data from the given cache line.

BRIEF DESCRIPTION OF THE DRAWINGS

The following detailed description makes reference to the accompanying drawings, which are now briefly described.

Figure 1:
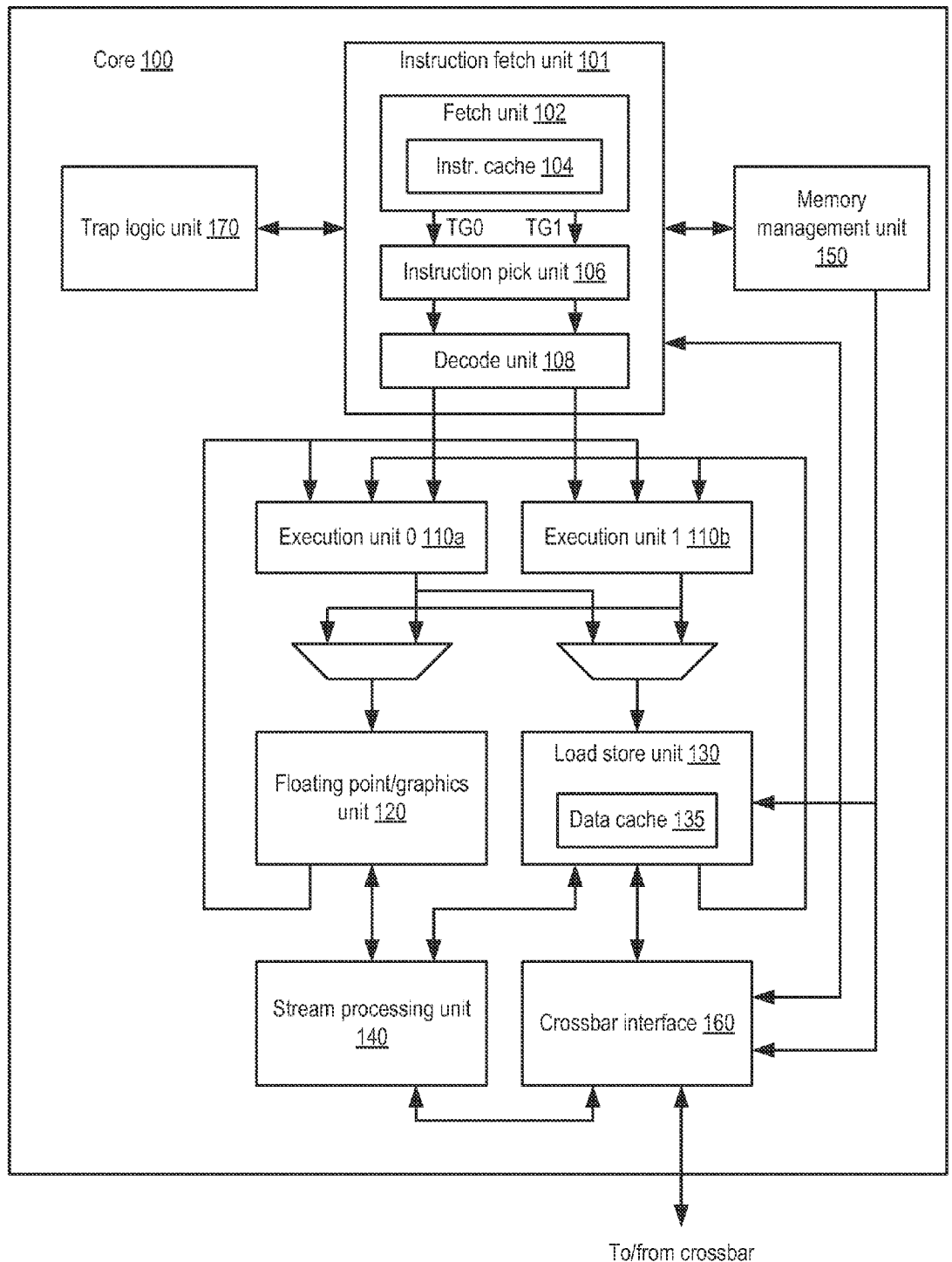
FIG. 1 illustrates a block diagram illustrating an embodiment of a processor core.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Introduction

Generally speaking, a processor core (or simply, a "core") may refer to a unit of a processor that is capable of executing program instructions and processing data independently of other processor cores within the processor, such that multiple cores may execute instructions concurrently. Performance of a processing core may be impacted by a multitude of factors, including processor clock speed, the number of cores in the processor, and speed of the memory accesses.

In some embodiments, a mechanism that may be utilized for improving the speed of the memory accesses and therefore the performance of a processing core is to have a cache memory between the processor and the memory or memories from which data and program instructions are read. Caches may improve performance of a processor by storing data and/or instructions from frequently accessed memory locations in a local memory that may have faster access times than the original memory. However, use of a cache may present issues under certain circumstances.

One possible issue with the use of caches occurs when multiple cores or multiple subsystems within a single core access the same memory location. In such a case, one core or core subsystem may modify the contents at a particular memory location. A second core or core subsystem may access the same memory location expecting the original data to be stored at the location. To prevent such occurrences, cache coherency protocols may be utilized as mentioned above.

Various embodiments of a cache memory and methods to manage cache coherency are discussed in this disclosure. The embodiments illustrated in the drawings and described below may provide techniques for managing coherency of a shared cache within a computing system that may prevent erroneous operation of a processor.

Overview of Multithreading Processor Core

An embodiment of a processor core is illustrated in FIG. 1 as core 100. In the illustrated embodiment, core 100 may be configured to execute instructions and to process data according to a particular Instruction Set Architecture (ISA). In one embodiment, core 100 may be configured to implement the SPARC® V9 ISA, although in other embodiments it is contemplated that any desired ISA may be employed, such as x86, PowerPC® or MIPS®, for example. Additionally, as described in greater detail below, in some embodiments each instance of core 100 may be configured to execute multiple threads concurrently, where each thread may include a set of instructions that may execute independently of instructions from another thread. In various embodiments it is contemplated that any suitable number of cores 100 may be included within a processor, and that cores 100 may concurrently process some number of threads.

In the illustrated embodiment, core 100 includes an instruction fetch unit (IFU) 101 coupled to a memory management unit (MMU) 150, a crossbar interface 260, a trap logic unit (TLU) 170, and a plurality of execution units (EXU0, EXU1) 110a-b. (Execution units 110a-b may also be referred to generically as EXUs 110.) Each of execution units 110a-b is coupled to both a floating point/graphics unit (FGU) 120 and a load store unit (LSU) 130. Each of the latter units is also coupled to send data back to each of execution units 110a-b. Both FGU 120 and LSU 130 are coupled to a stream processing unit (SPU) 140. Additionally, LSU 130, SPU 140 and MMU 150 are coupled to crossbar interface 160, which is in turn coupled to a crossbar (not shown).

Instruction fetch unit 101 may be configured to provide instructions to the rest of core 100 for execution. In the illustrated embodiment, IFU 101 includes a fetch unit 102, an instruction pick unit 106, and a decode unit 108. Fetch unit 102 further includes an instruction cache 104. In one embodiment, fetch unit 102 may include logic to maintain fetch addresses (e.g., derived from program counters) corresponding to each thread being executed by core 100, and to coordinate the retrieval of instructions from instruction cache 104 according to those fetch addresses. In some embodiments, instruction cache 104 may include fewer access ports than the number of threads executable on core 100, in which case fetch unit 102 may implement arbitration logic configured to select one or more threads for instruction fetch during a given execution cycle. For example, fetch unit 102 may implement a least-recently-fetched algorithm to select a thread to fetch. Fetch unit 102 may also implement logic to handle instruction cache misses and translation of virtual instruction fetch addresses to physical addresses (e.g., fetch unit 102 may include an Instruction Translation Lookaside Buffer (ITLB)). Additionally, in some embodiments, fetch unit 102 may include logic to predict branch outcomes and/or fetch target addresses, such as a Branch History Table (BHT), Branch Target Buffer (BTB), or other suitable structure, for example.

In one embodiment, fetch unit 102 may be configured to maintain a pool of fetched, ready-for-issue instructions drawn from among each of the threads being executed by core 100. For example, fetch unit 102 may implement a respective instruction buffer corresponding to each thread in which several recently-fetched instructions from the corresponding thread may be stored. In one embodiment, instruction pick unit 106 may be configured to select one or more instructions to be decoded and issued to execution units 110. In the illustrated embodiment, the threads fetched by fetch unit 102 may be divided into two thread groups denoted TG0 and TG1 (for example, if core 100 implements eight threads, each of TG0 and TG1 may include four threads).

Pick unit 106, in the illustrated embodiment, may be configured to attempt to select one instruction to schedule for execution from each of TG0 and TG1, such that two instructions may be selected for execution during a given execution cycle. For example, pick unit 106 may employ a least-recently-picked (LRP) algorithm in which the least recently picked thread within a given thread group that is ready for execution is selected. It is noted that in one embodiment, thread fetching as performed by fetch unit 102 and instruction selection as performed by pick unit 106 may be largely independent of one another. In other embodiments, it is contemplated that other instruction selection algorithms may be employed, including algorithms that take additional instruction scheduling factors into account. Further, it is contemplated that in some embodiments, pick unit 106 may be configured to select more than two instructions for execution in a given execution cycle, or may select instructions from all threads rather than specific groups of threads. Additionally, in one embodiment pick unit 106 may be configured to identify source operand dependencies that a given picked instruction may have on a previously issued instruction, and may configure other logic to appropriately select source operands (e.g., from a register file, or from a previous execution cycle via bypass logic).

Decode unit 108 may be configured to further prepare instructions selected by pick unit 106 for execution. In the illustrated embodiment, decode unit 108 may be configured to identify the specific type of a given instruction, such as whether the instruction is an integer, floating point, load/store, or other type of instruction, as well as to identify operands required by the given instruction. Additionally, in one embodiment decode unit 108 may be configured to detect and respond to scheduling hazards not detected during operation of pick unit 106.

In some embodiments, instructions from a given thread may be speculatively issued from decode unit 108 for execution. For example, a given instruction from a certain thread may fall in the shadow of a conditional branch instruction from that same thread that was predicted to be taken or not-taken, or a load instruction from that same thread that was predicted to hit in data cache 135, but for which the actual outcome has not yet been determined. In such embodiments, after receiving notice of a misspeculation such as a branch misprediction or a load miss, IFU 100 may be configured to cancel misspeculated instructions from a given thread as well as issued instructions from the given thread that are dependent on or subsequent to the misspeculated instruction, and to redirect instruction fetch appropriately.

Execution units 110*a-b* may be configured to execute and provide results for certain types of instructions issued from IFU 100. In one embodiment, each of EXUs 110 may be similarly or identically configured to execute certain integer-type instructions defined in the implemented ISA, such as arithmetic, logical, and shift instructions. In the illustrated embodiment, EXU0 110*a* may be configured to execute integer instructions issued from TG0, while EXU1 110*b* may be configured to execute integer instructions issued from TG1. Further, each of EXUs 110 may include an integer register file configured to store register state information for all threads in its respective thread group. For example, if core 100 implements eight threads 0-7 where threads 0-3 are bound to TG0 and threads 4-7 are bound to TG1, EXU0 110*a* may store integer register state for each of threads 0-3 while EXU1 110*b* may store integer register state for each of threads 4-7. It is contemplated that in some embodiments, core 100 may include more or fewer than two EXUs 110, and EXUs 110 may or may not be symmetric in functionality. Also, in some embodiments EXUs 110 may not be bound to specific thread groups or may be differently bound than just described.

Floating point/graphics unit 120 may be configured to execute and provide results for certain floating-point and graphics-oriented instructions defined in the implemented ISA. For example, in one embodiment FGU 120 may implement single- and double-precision floating-point arithmetic instructions compliant with the IEEE 754 floating-point standard, such as add, subtract, multiply, divide, and certain transcendental functions. Also, in one embodiment FGU 120 may implement partitioned-arithmetic and graphics-oriented instructions defined by a version of the SPARC® Visual Instruction Set (VIS™) architecture, such as VIS™ 1.0. Additionally, in one embodiment FGU 120 may implement certain integer instructions such as integer multiply, divide, and population count instructions, and may be configured to perform multiplication operations on behalf of stream processing unit 140. Depending on the implementation of FGU 120, some instructions (e.g., some transcendental or extended-precision instructions) or instruction operand or result scenarios (e.g., certain denormal operands or expected results) may be trapped and handled or emulated by software.

Load store unit 130 may be configured to process data memory references, such as integer and floating-point load and store instructions as well as memory requests that may originate from stream processing unit 140. In some embodiments, LSU 130 may also be configured to assist in the processing of instruction cache 104 misses originating from IFU 100. LSU 130 may include a data cache 135 as well as logic configured to detect cache misses and to responsively request data from an L2 cache (not shown in FIG. 1) via crossbar interface 160. In one embodiment, data cache 135 may be configured as a write-through cache in which all stores are written to the L2 cache regardless of whether they hit in data cache 135; in some such embodiments, stores that miss in data cache 135 may cause an entry corresponding to the store data to be allocated within the cache. In other embodiments, data cache 135 may be implemented as a write-back cache.

In one embodiment, LSU 130 may include a miss queue configured to store records of pending memory accesses that have missed in data cache 135 such that additional memory accesses targeting memory addresses for which a miss is pending may not generate additional L2 cache request traffic. In the illustrated embodiment, address generation for a load/store instruction may be performed by one of EXUs 110. Depending on the addressing mode specified by the instruction, one of EXUs 110 may perform arithmetic (such as adding an index value to a base value, for example) to yield the desired address. Additionally, in some embodiments LSU 130 may include logic configured to translate virtual data addresses generated by EXUs 110 to physical addresses, such as a Data Translation Lookaside Buffer (DTLB).

Stream processing unit 140 may be configured to implement one or more specific data processing algorithms in hardware. For example, SPU 140 may include logic configured to support encryption/decryption algorithms such as Advanced Encryption Standard (AES), Data Encryption Standard/Triple Data Encryption Standard (DES/3DES), or Ron's Code #4 (RC4). SPU 140 may also include logic to implement hash or checksum algorithms such as Secure Hash Algorithm (SHA-1, SHA-256), Message Digest 5 (MD5), or Cyclic Redundancy Checksum (CRC). SPU 140 may also be configured to implement modular arithmetic such as modular multiplication, reduction and exponentiation. In one embodiment, SPU 140 may be configured to utilize the multiply array included in FGU 120 for modular multiplication. In various embodiments, SPU 140 may implement several of the aforementioned algorithms as well as other algorithms not specifically described.

Such translation mappings may be stored in an ITLB or a DTLB for rapid translation of virtual addresses during lookup of instruction cache 104 or data cache 135. In the event no translation for a given virtual page number is found in the appropriate TLB, memory management unit 150 may be configured to provide a translation. In one embodiment, MMU 150 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 150 is unable to derive a valid address translation, for example if one of the memory pages including a necessary page table is not resident in physical memory (i.e., a page miss), MMU 150 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 100 or LSU 130 may generate access requests to L2 cache 120 in response to their respective cache misses. SPU 140 may be configured to generate its own load and store requests independent of LSU 130, and MMU 150 may be configured to generate memory requests while executing a page table walk. Other types of off-core access requests are possible and contemplated. In the illustrated embodiment, crossbar interface 160 may be configured to provide a centralized interface to the port of a crossbar associated with a particular core 100, on behalf of the various functional units that may generate accesses that traverse the crossbar. In one embodiment, crossbar interface 160 may be configured to maintain queues of pending crossbar requests and to arbitrate among pending requests to determine which request or requests may be conveyed to the crossbar during a given execution cycle. For example, crossbar interface 160 may implement a least-recently-used or other algorithm to arbitrate among crossbar requestors. In one embodiment, crossbar interface 160 may also be configured to receive data returned via the crossbar, such as from an L2 cache, and to direct such data to the appropriate functional unit (e.g., data cache 135 for a data cache fill due to miss). In other embodiments, data returning from the crossbar may be processed externally to crossbar interface 160.

During the course of operation of some embodiments of core 100, exceptional events may occur. For example, an instruction from a given thread that is picked for execution by pick unit 106 may be not be a valid instruction for the ISA implemented by core 100 (e.g., the instruction may have an illegal opcode), a floating-point instruction may produce a result that requires further processing in software, MMU 150 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 170 may be configured to manage the handling of such events. For example, TLU 170 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 170 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 170 may implement such traps as precise traps. That is, TLU 170 may ensure that all instructions from the given thread that occur before the trapping instruction (in program order) complete and update architectural state, while no instructions from the given thread that occur after the trapping instruction (in program) order complete or update architectural state.

Processor Configurations Including Multiple Cores

Figure 2:
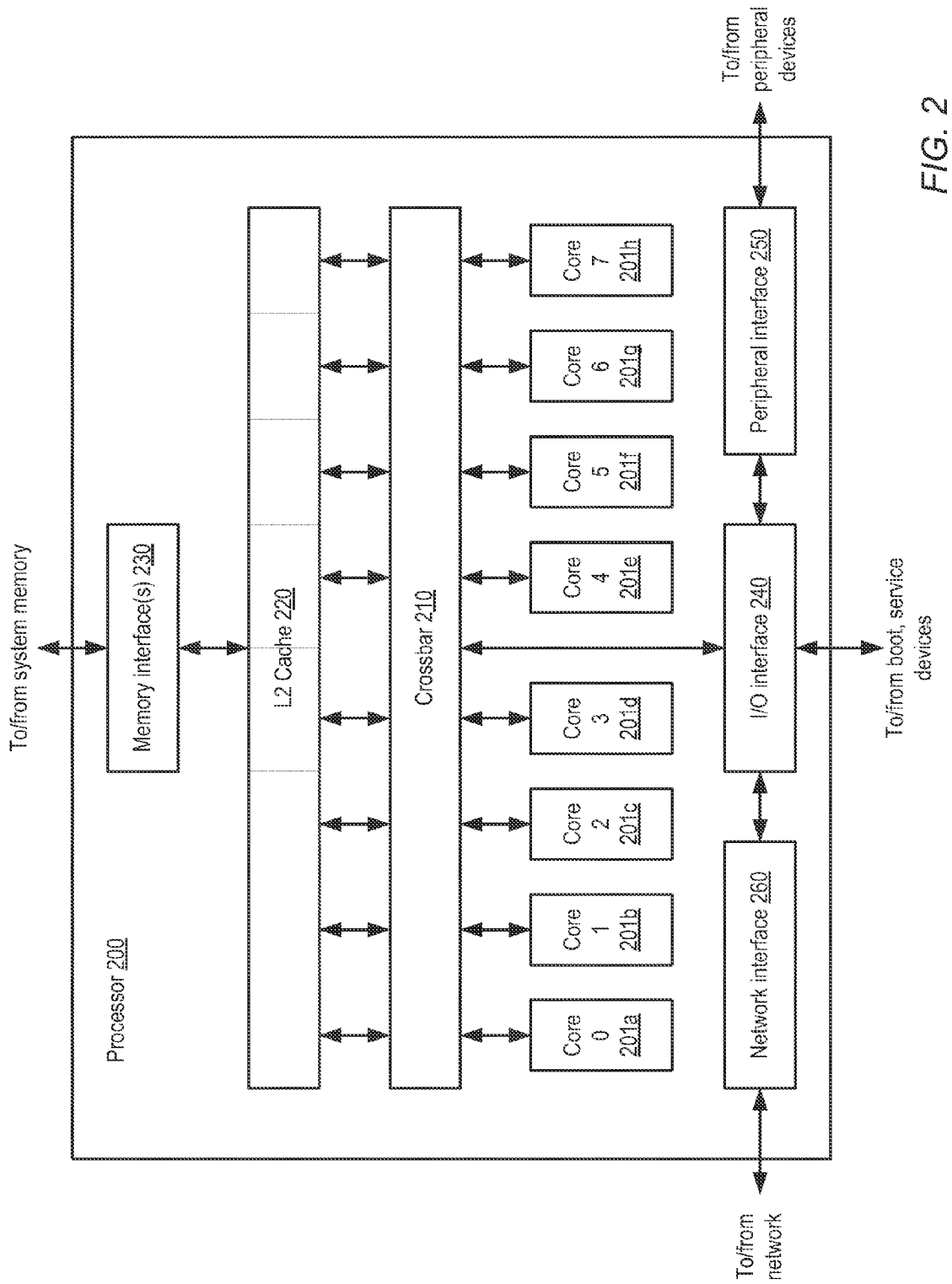
FIG. 2 is a block diagram illustrating an embodiment of a multicore processor.

In various embodiments, a multicore processor may include a number of instances of a processing core, such as, e.g., core 100 as illustrated in FIG. 1, as well as other features. One example of an 8-core processor is depicted in FIG. 2. In the illustrated embodiment, processor 200 may include eight instances of a core, such as, for example, core 100 from FIG. 1, denoted as cores 201*a-h* and also designated "core 0" though "core 7." Each of cores 201 is coupled to L2 cache 220 via crossbar 210. L2 cache 220 is coupled to one or more memory interface(s) 230, which are coupled in turn to one or more banks of system memory (not shown). Additionally, crossbar 210 couples cores 201 to input/output (I/O) interface 240, which is in turn coupled to peripheral interface 250 and network interface 260. As described in greater detail below, I/O interface 240, peripheral interface 250 and network interface 260 may respectively couple processor 200 to boot and/or service devices, peripheral devices, and a network.

Crossbar 210 may be configured to manage data flow between cores 201 and the shared L2 cache 220. In one embodiment, crossbar 210 may include logic (such as multiplexers or a switch fabric, for example) that allows any core 201 to access any bank of L2 cache 220, and that conversely allows data to be returned from any L2 bank to any core 201. Crossbar 210 may be configured to concurrently process data requests from cores 201 to L2 cache 220 as well as data responses from L2 cache 220 to cores 201. In some embodiments, crossbar 210 may include logic to queue data requests and/or responses, such that requests and responses may not block other activity while waiting for service. Additionally, in one embodiment crossbar 210 may be configured to arbitrate conflicts that may occur when multiple cores 201 attempt to access a single bank of L2 cache 220 or vice versa.

L2 cache 220 may be configured to cache instructions and data for use by cores 201. In the illustrated embodiment, L2 cache 220 may be organized into eight separately addressable banks that may each be independently accessed, such that in the absence of conflicts, each bank may concurrently return data to a respective core 201. In some embodiments, each individual bank may be implemented using set-associative or direct-mapped techniques. For example, in one embodiment, L2 cache 220 may be a 4 megabyte (MB) cache, where each 512 kilobyte (KB) bank is 16-way set associative with a 64-byte line size, although other cache sizes and geometries are possible and contemplated. L2 cache 220 may be implemented in some embodiments as a writeback cache in which written (dirty) data may not be written to system memory until a corresponding cache line is evicted. A cache eviction may refer to the process of removing an entry from a cache line. In some embodiments, to remove a cache entry may comprise clearing the associated tag, leaving the actual data in memory until it is overwritten by a new cache entry. In other embodiments, removing a cache entry may comprise clearing both the tag entry and the data entry associated with the cache line.

In some embodiments, L2 cache 220 may implement queues for requests arriving from and results to be sent to crossbar 210. Additionally, in some embodiments L2 cache 220 may implement a fill buffer configured to store fill data arriving from memory interface 230, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 220 may variously be implemented as single-port or multi-port memories (i.e., capable of processing multiple concurrent read and/or write accesses). In either case, L2 cache 220 may implement arbitration logic to prioritize cache access among various cache read and write requestors. L2 cache 220 will be discussed in more detail below.

Memory interface 230 may be configured to manage the transfer of data between L2 cache 220 and system memory, for example, in response to L2 fill requests and data evictions. In some embodiments, multiple instances of memory interface 230 may be implemented, with each instance configured to control a respective bank of system memory. Memory interface 230 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 230 may be configured to support interfacing to multiple different types of system memory.

In the illustrated embodiment, processor 200 may also be configured to receive data from sources other than system memory. I/O interface 240 may be configured to provide a central interface for such sources to exchange data with cores 201 and/or L2 cache 220 via crossbar 210. In some embodiments, I/O interface 240 may be configured to coordinate Direct Memory Access (DMA) transfers of data between network interface 260 or peripheral interface 250 and system memory via memory interface 230. In addition to coordinating access between crossbar 210 and other interface logic, in one embodiment I/O interface 240 may be configured to couple processor 200 to external boot and/or service devices. For example, initialization and startup of processor 200 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

Peripheral interface 250 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 250 may implement one or more instances of an interface such as Peripheral Component Interface Express (PCI Express®), although it is contemplated that any suitable interface standard or combination of standards may be employed. For example, in some embodiments, peripheral interface 250 may be configured to implement a version of Universal Serial Bus (USB) protocol or IEEE 1394 (Firewire®) protocol in addition to or instead of PCI Express®.

Network interface 260 may be configured to coordinate data transfer between processor 200 and one or more devices (e.g., other computer systems) coupled to processor 200 via a network. In one embodiment, network interface 260 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 260 may be configured to implement multiple discrete network interface ports.

It is noted that FIG. 2 is merely an example of a multicore processor. Various embodiments may include a different number of cores, a different number of caches, and/or a different set of interfaces, such as, e.g., each core may have its own L2 cache rather than sharing a single L2 cache.

Overview of Addressing Modes

Figure 3:
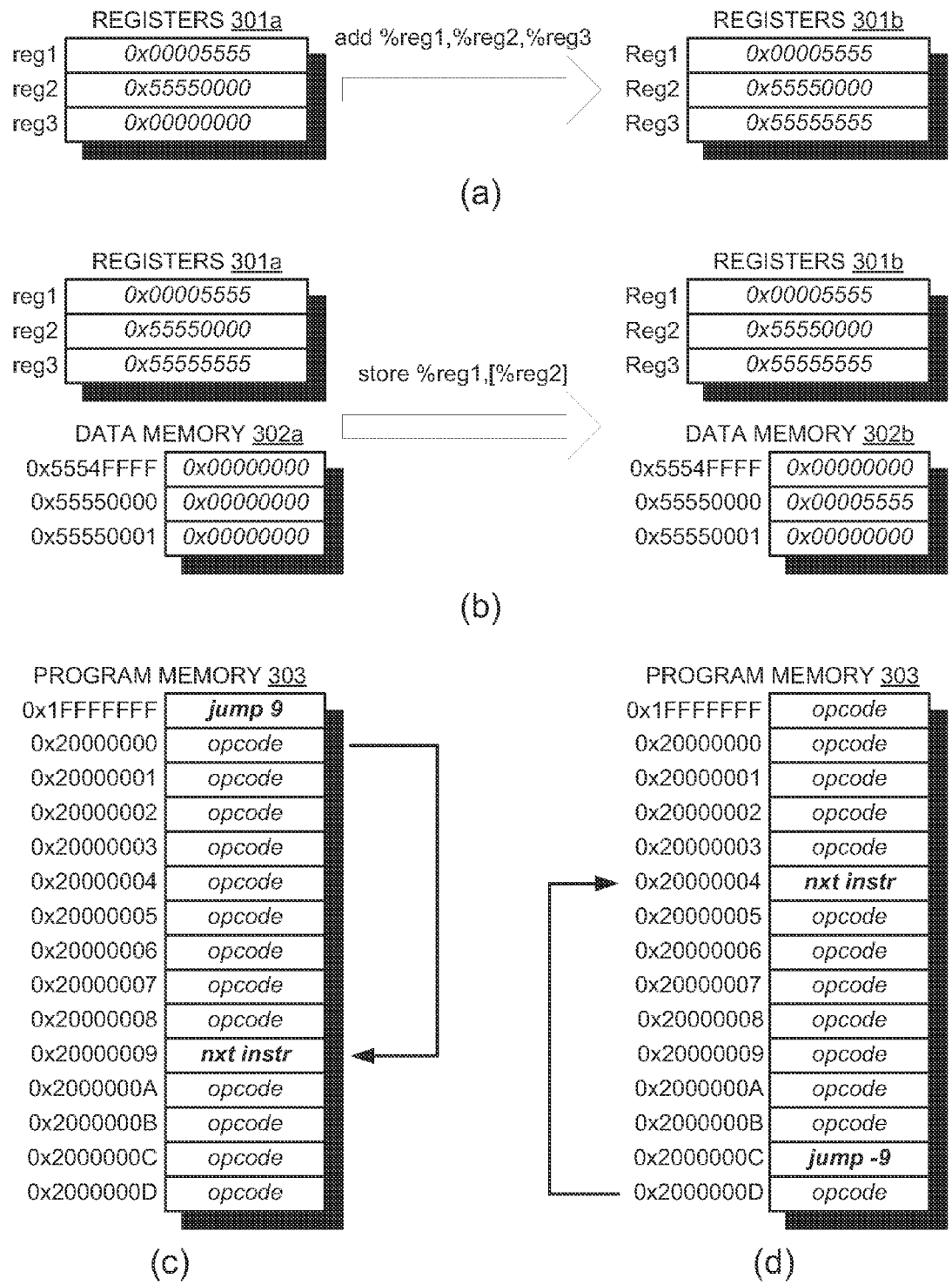
FIG. 3 illustrates diagrams of various addressing modes.

An ISA may have a number of different addressing modes. Examples of some addressing modes are register, indexed, and relative. Register addressing may refer to when the source and/or destination of the instruction is one of the processor's registers. An example is illustrated in FIG. 3(*a*), where Registers 301*a* may show the contents of three registers before the instruction "add % reg1, % reg2, % reg3" is executed and Registers 301*b* may show the contents of the same registers after the instruction is executed. The instruction "add % reg1, % reg2, % reg3" may add the contents of register 1 (0x00005555) to the contents of register 2 (0x55550000) and put the result in register 3 (0x55555555). It is noted that only the value of register 3 may change.

Indexed addressing may be when a source or destination address is contained in one of the processor's registers. An example of indexed addressing is illustrated in FIG. 3(*b*), where Registers 301*a* may again show the contents of three registers before the instruction "store % reg1, [% reg2]" is executed and Registers 301*b* may show the contents of the same registers after the instruction is executed. Data Memory 302*a* may show the content of three memory locations before the instruction and Data Memory 302*b* may show the contents of the same memory locations after the instruction is executed. The instruction "store % reg1, [% reg2]" may store the contents of register 1 (0x00005555) into a memory location set by the value of register 2 (0x55550000). It is noted that none of the values in the registers changed, only the value of memory location 0x55550000 may change.

With relative addressing, the address operand of the instruction may be an offset that is added to the value of the processor's program counter (PC). This addressing mode may typically be used for branching instructions, which may also be known as flow control or control transfer instructions. Branch instructions may be used to skip ahead or jump back a certain number of instructions. An example of relative addressing is illustrated in FIG. 3(*c*), where Program Memory 303 shows the flow of a "jump 9" instruction. The "jump 9" instruction executed at address 0x1fffffff may add 9 to the next value of the PC (0x20000000), causing the next instruction to be fetched to be at PC+9 (0x20000009) rather than PC (0x20000000), skipping all instructions located between PC (0x20000000) and PC+8 (0x20000008). A negative value may be used to jump backwards in the program. For example, see FIG. 3(*d*), where a "jump −9" instruction executed at address 0x2000000C may cause the next instruction to be fetched from PC-9 (0x20000004) rather than (0x2000000D).

A difference between the register and indexed addressing and relative addressing may be that register and indexed addressing may both rely on values in the processor's registers, while relative addressing may only rely on the PC and a constant value. Since values of registers may be different each time a section of code is executed, these address modes may need to be calculated each time the section of code is executed. However, with relative addressing, since the PC may have the same value each time a section of code is executed, it may be possible to calculate the branch address once and save the calculated value when a relative address instruction is cached.

The examples of FIG. 3 are merely for demonstration. It is known that other addressing methods may be used in place of or in conjunction with the illustrated addressing modes. Actual implementations may differ from the illustrations. For example, the syntax used in the examples is only intended to demonstrate how various addressing modes may be implemented and is not intended to represent any specific ISA. Likewise, address and data values are shown to be 32 bits in length, whereas it is noted that address and data values may vary, higher or lower, based on the respective architecture of the processor.

Cache Controller Supporting Modified Instructions

Figure 4:
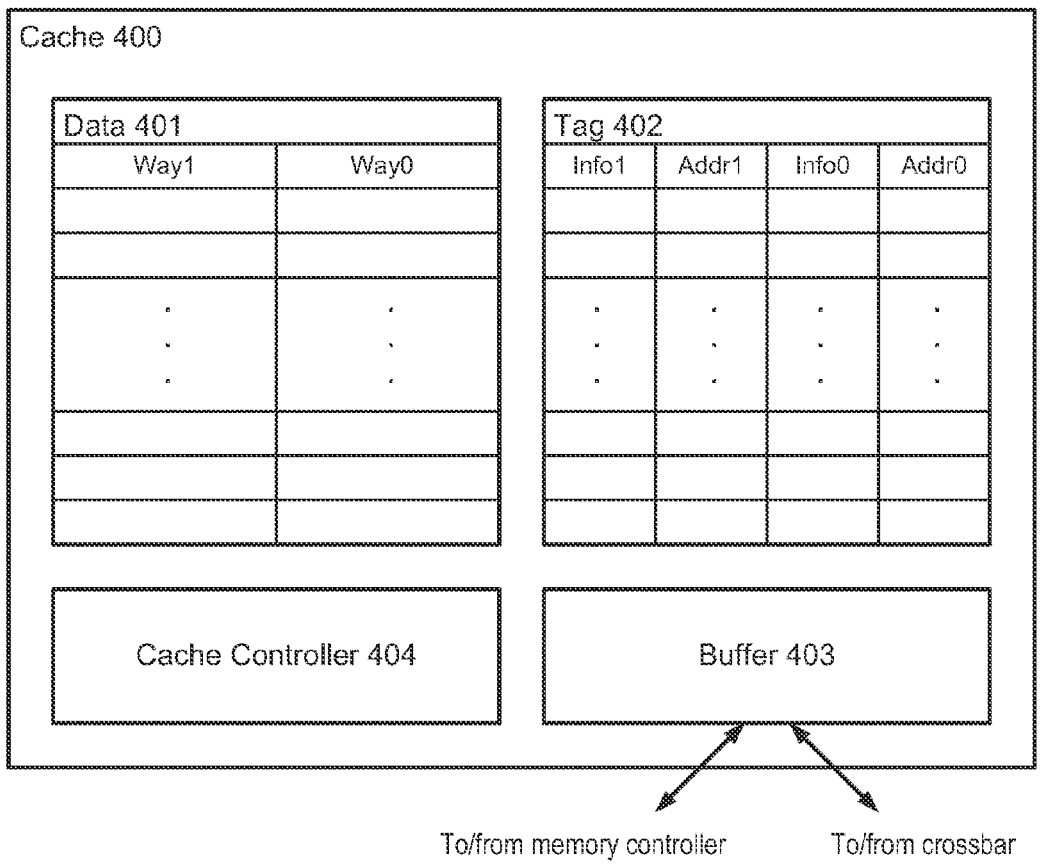
FIG. 4 is a block diagram illustrating an embodiment of a cache unit.

Turning to FIG. 4, an embodiment of a cache is illustrated. Cache 400 may correspond to L2 cache 220 as illustrated in FIG. 2. Cache 400 may comprise data memory 401, tag array 402, cache buffer 403, and cache controller 404.

Data memory 401 may be configured to store instructions and data for one or more cores, such as cores 201 from FIG. 2. Data memory 401 is illustrated with a 2-way set associative configuration. In other embodiments, data memory 401 may be organized using a different number of ways, such as 4-way, 8-way or 16-way, or using direct mapped techniques. A cache way refers to the number of places within a cache that each memory location of the main memory may be stored. For example, 4-way organization may correspond to a cache designed to store each main memory location in one of four cache locations. Generally speaking, the more ways a cache has, the longer the cache takes to determine if a particular memory access is stored within the cache or not. Data memory 401 may be sub-divided into lines, representing one cache entry, comprising a number of bytes, such as, for example, 8 bytes, 16 bytes or 64 bytes.

Tag array 402 may store information corresponding to each cache line of data memory 401. The information in a given tag may be comprised of address information corresponding to the address of the data or instruction in the main memory and state information corresponding to the use of the cache line. In some embodiments, tag array 402 may be implemented as a part of the same physical memory array as the data array and, in other embodiments, tag array 402 may be located in a separate physical memory array.

Cache buffer 403 may be configured to queue a series of cache access requests and/or responses to such requests. In other embodiments, cache buffer 403 may be implemented as a cache miss buffer and/or as an evicted data buffer. Cache buffer 403 may be coupled to a crossbar switch, such as crossbar 210 from FIG. 2, and/or to a memory interface, such as memory interface 230 from FIG. 2.

Cache controller 404 may be configured to manage aspects of cache 400 operation, including, incoming cache access requests, outgoing replies to access requests and fetches from higher-level memory. A higher-level memory may refer to a memory that may be larger than cache 400, however, may have a slower access time. In a various embodiments, a higher-level memory may be another cache or a higher-level memory may be the main system memory. In some embodiments, cache controller 404 may keep tag array 402 up-to-date as new data is stored in cache lines and invalid data is evicted. Cache controller may determine if an incoming cache request is a hit or a miss, i.e, if the requested memory location is (a hit) or is not (a miss) currently stored in the cache.

In response to a cache access for a branch instruction that has not been previously cached, the cache controller may retrieve the instruction from system memory. In some embodiments, a given core 201 may determine the instruction is a branch instruction with a relative address as an operand and may calculate the actual target address for the branch using the operand and the instruction's address in the main memory. In such an embodiment, the given core 201 may write the instruction back to cache 400 with the calculated address in place of the relative address. In other embodiments, cache controller 404 may determine the instruction is a branch instruction and may calculate the actual target address for the branch. In either embodiment, cache controller 404 may save the branch instruction in data memory 401 with the calculated target address, which may be referred to as a modified instruction store. By saving the calculated target address rather than the relative address, one or more CPU cycles may be saved by not having to calculate the actual target address upon further execution of the instruction.

Figure 5:
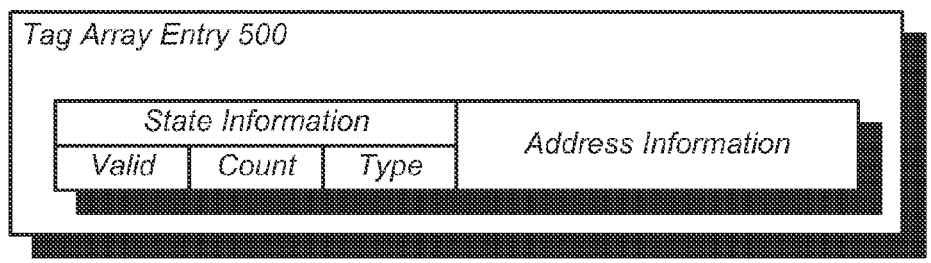
FIG. 5 illustrates a format for a cache tag.

In an embodiment as just described, cache controller 404 may include an indicator in the cache tag for a cache line that includes an instruction rather than memory data. This indicator may be referred to as a type tag. An example of an entry in tag array 402 is illustrated in FIG. 5. In this embodiment, tag array entry 500 is comprised of two components: a state information tag and an address information tag. The address information tag may correspond to the address, in the main memory, of the data or instruction being cached. The state information tag may be comprised of various pieces of state information related to the corresponding cache line in data memory 401. For example, the state information may include a valid flag to indicate if the cache entry is still valid or if another cache in the system has stored new data at the same address in main memory. Some embodiments may include a count bit field indicating a count of how many times the current cache entry has been accessed. Other embodiments may use a similar bit field to indicate a count of how long since the cache entry has been accessed. A cache entry associated with cache controller 404 may also include a type flag to indicate if the cache entry contains a modified instruction or an unmodified instruction or data.

When a request comes in from a core, such as, e.g., one of the cores 201 as illustrated in FIG. 2, and it is determined that the address matches, cache controller 404 may validate that the request is for an instruction and not for data. In some embodiments, this validation may be determined by the source of the cache request. A core similar to core 100 from FIG. 1 may generate cache accesses from one of several sources, such as, for example, IFU 101, MMU 150, SPU 140, or LSU 130. If a request comes from IFU 101, then the request may be considered an instruction fetch. If the request comes from a different source, such as MMU 150, then the request may be considered a data fetch.

For example, in a case in which a modified instruction is the target of a cache request from IFU 101, cache controller 404 may determine the request to be a cache hit if the requested address matches the address information tag, in which case cache 400 will return the modified instruction. However, if the cache request comes from MMU 150, then cache controller 404 may determine the request to be a cache miss despite the requested address matching the address tag. This circumstance may be described as a data type mismatch.

In some embodiments, unmodified instructions may have the same type tag as memory data. As an example, if an unmodified instruction or data is the target of a cache request, cache controller 404 may determine the request is a cache hit if the address tag matches the requests. Cache controller 404 may return the data/instruction to the requestor regardless if the requestor is IFU 101 or MMU 150. Therefore, in such an embodiment, modified instructions may only be accessed by IFU 101 and unmodified instructions or memory data may be accessed by either IFU 101 or MMU 150.

In other embodiments, all instructions modified or not, may be tagged as instruction type and all memory data tagged as data type. In these embodiments, cache controller 404 may only determine a cache hit if IFU 101 requests match both address and instruction type tags and if MMU 150 requests match both address and memory data type tags.

It is noted that the cache of FIG. 4 is merely an example. In other embodiments, a cache memory may not include buffer 403, and data memory 401 may not be set associative and instead be configured as a direct-mapped cache.

Processor Configurations Including Multiple Cores

Figure 6:
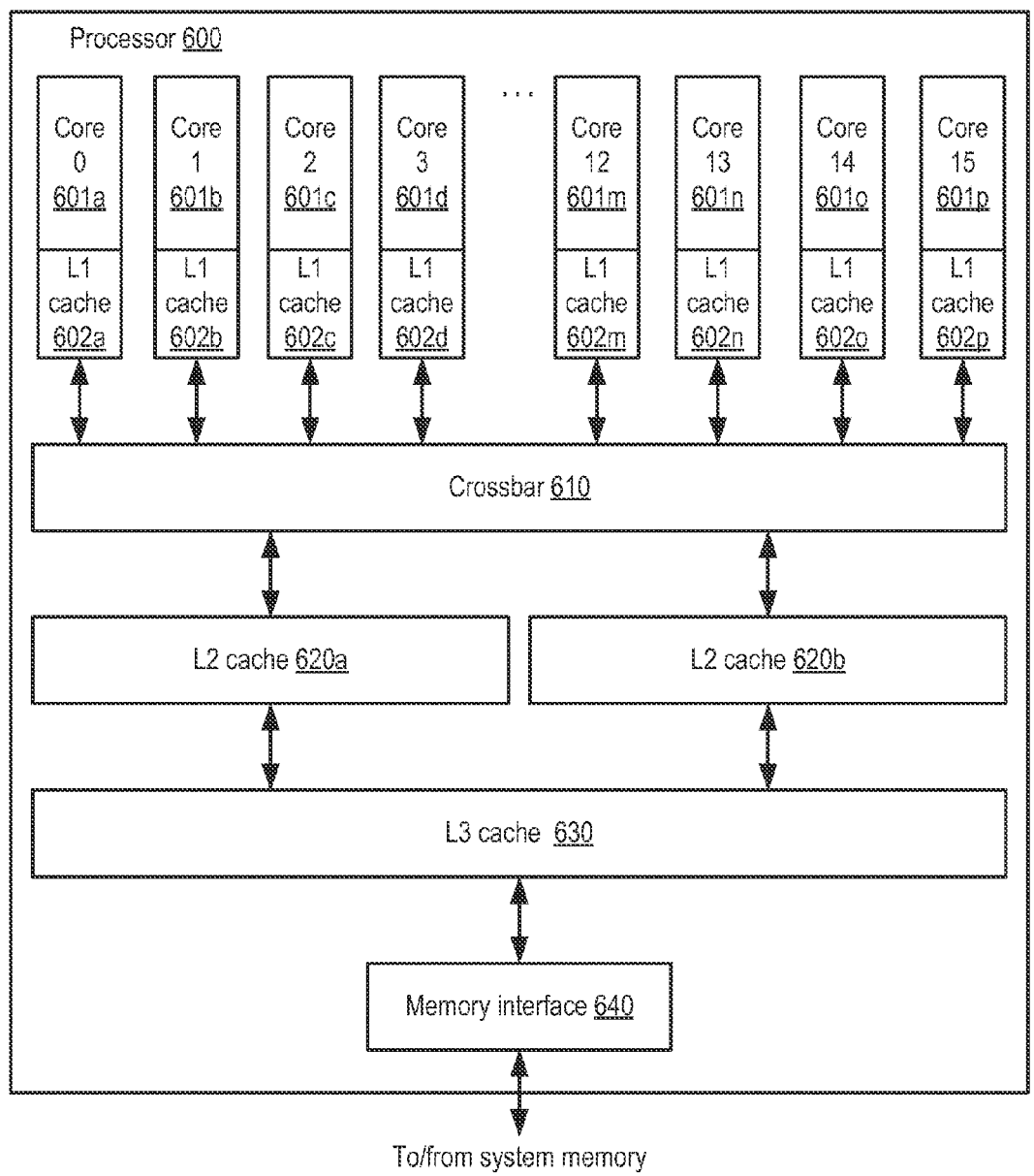
FIG. 6 is a block diagram illustrating another embodiment of a multicore processor.

Other possible configurations of processor 200 may include more or fewer processor cores than the version shown in FIG. 2, and may also include other or different features. FIG. 6 illustrates one such alternative embodiment. In the embodiment shown in FIG. 6, processor 600 includes 16 instances of core 601, denoted as cores 601*a-p* as well as "core 0" through "core 15," although for clarity, not all instances are shown in FIG. 6. Cores 601*a-p* each include local L1 cache 602*a-p*. Cores 601*a-p* are coupled to L2 caches 620*a* and 620*b* through crossbar 610. In addition, cores 601*a-p* are coupled to L3 cache 630 as well as memory interface 640. It is noted that in various embodiments, the organization of FIG. 6 may represent a logical organization rather than a physical organization, and other components may also be employed. For example, in some embodiments, cores 601*a-p* and L2 caches 420*a-b* may not connect directly to crossbar 410, but may instead interface with the crossbar through intermediate logic.

L1 caches 602*a-p* may reside within cores 601*a-p* or may reside between cores 601*a-p* and crossbar 610. L1 caches 602*a-p* may be configured to cache instructions and data for use by their associated cores 601*a-p*. In some embodiments, each individual cache 602*a-p* may be implemented using set-associative or direct-mapped techniques. For example, in one embodiment, L1 caches 602*a-p* may be 64 kilobyte (KB) caches, where each L1 cache 602*a-p* is 2-way set associative with a 64-byte line size, although other cache sizes and geometries are possible and contemplated.

Like crossbar 210 discussed above, crossbar 610 may be configured to manage data flow between cores 601*a-p* and the shared L2 caches 420*a-b*. In various embodiments, crossbar 610 may be implemented using any of the features or characteristics noted above with respect to crossbar 210. In particular, crossbar 610 may be configured to facilitate the exchange of data between any core 601 and any L2 cache 620. It is noted that in various embodiments, crossbars 610 may be implemented using any suitable type of interconnect network, which, in some embodiments, may correspond to a physical crossbar interconnect.

L2 caches 620*a-b* may be configured to cache instructions and data for use by cores 601*a-p*, in a manner similar to L2 cache 220 discussed above. L2 cache 620*a* may be coupled to cores 601*a-h* and L2 cache 620*b* may similarly be coupled to cores 601*i-p*. As the number of cores 601 is increased, the size and/or number of L2 caches 620 may also be increased in order to accommodate the additional cores 601. For example, in an embodiment including 16 cores 601, L2 cache 620 may be configured as 2 caches of 3 MB each, with each cache including 8 individual cache banks of 384 KB, where each bank may be 24-way set associative with 256 sets and a 64-byte line size, although any other suitable cache size or geometry may also be employed.

As with L2 cache 220, in some embodiments, L2 caches 620*a-b* may include various queues and buffers configured to manage the flow of data to and from crossbar 610 as well as to and from L3 cache 630. For example, L2 caches 620*a-b* may implement fill buffers, writeback buffers, and/or miss buffers such as described above with respect to L2 cache 220. In some embodiments, multiple banks of L2 cache 620 may share single instances of certain data structures or other features. For example, a single instance of a fill buffer may be shared by multiple banks of an L2 cache 620 in order to simplify the physical implementation (e.g., routing and floor-planning) of L2 cache 420. Despite this sharing, individual banks of L2 caches 620*a-b* may be configured to concurrently and independently process accesses to data stored within the banks when such concurrency is possible.

Like L1 caches 601*a-p* and L2 caches 620*a-b*, L3 cache 630 may be configured to cache instructions and data for use by cores 601*a-p*. In the illustrated embodiment, L3 cache 630 may be organized into two separately addressable banks that may each be independently accessed, such that, in the absence of conflicts, each bank may concurrently return data to a respective cores 601*a-p*. In some embodiments, each individual bank may be implemented using set-associative or direct-mapped techniques. For example, in one embodiment, L3 cache 630 may be a 16 megabyte (MB) cache, where each 8 MB bank is 16-way set associative with a 64-byte line size, although other cache sizes and geometries are possible and contemplated.

The cache hierarchy may be established such that any core 601 may first access its respective L1 cache 602. If the access to L1 cache 602 is a miss, then the respective L2 cache 620 may be accessed. If the L2 cache 620 access is a miss, then L3 cache 630 may be accessed next. If all three cache levels miss, then system memory may be accessed through memory interface 640. In the case of a modified instruction store, some embodiments may store the modified instruction in all three cache levels. Storing the modified instruction in all three cache levels may save computing time since cache misses may occur less frequently in the higher-level caches. However, this may increase the complexity of the higher-level caches, as they may require additional logic to distinguish between instructions and non-instruction data. In various other embodiments, L1 cache 602 may receive the modified instruction store and L3 cache 630 may store the original unmodified instruction while L2 cache 620 may store the modified instruction in some embodiments and may store the unmodified instruction in others.

In some embodiments, processor 600 may be configured for use in multiprocessor systems in which multiple instances of processor 600 may share a common physical memory address space. For example, a multiprocessor system might include two, four, or some other number of processors 600. Each instance of processor 600 might be coupled to its own system memory (e.g., via memory interface 640, as discussed below). However, each processor 600 may also be configured to access system memory that is coupled to a remote processor 600 other than itself.

Similar to memory interface 230 discussed above, memory interface 640 may be configured to manage the transfer of data between L3 cache 630 and system memory in response to L3 fill requests and data evictions, for example. In some embodiments, multiple instances of memory interface 640 may be implemented, with each instance configured to control a respective bank of system memory. Memory interface 640 may be configured to interface to any suitable type of system memory, such as discussed above in regards to memory interface 230.

It is noted that FIG. 6 is merely an example of a multicore processor. In other embodiments, processor 600 may include network and/or peripheral interfaces similar to those shown in FIG. 2. The physical structure may not be represented by FIG. 6 as many other physical arrangements may be possible.

Methods for Handling Modified Instructions in a Shared Cache

Figure 7:
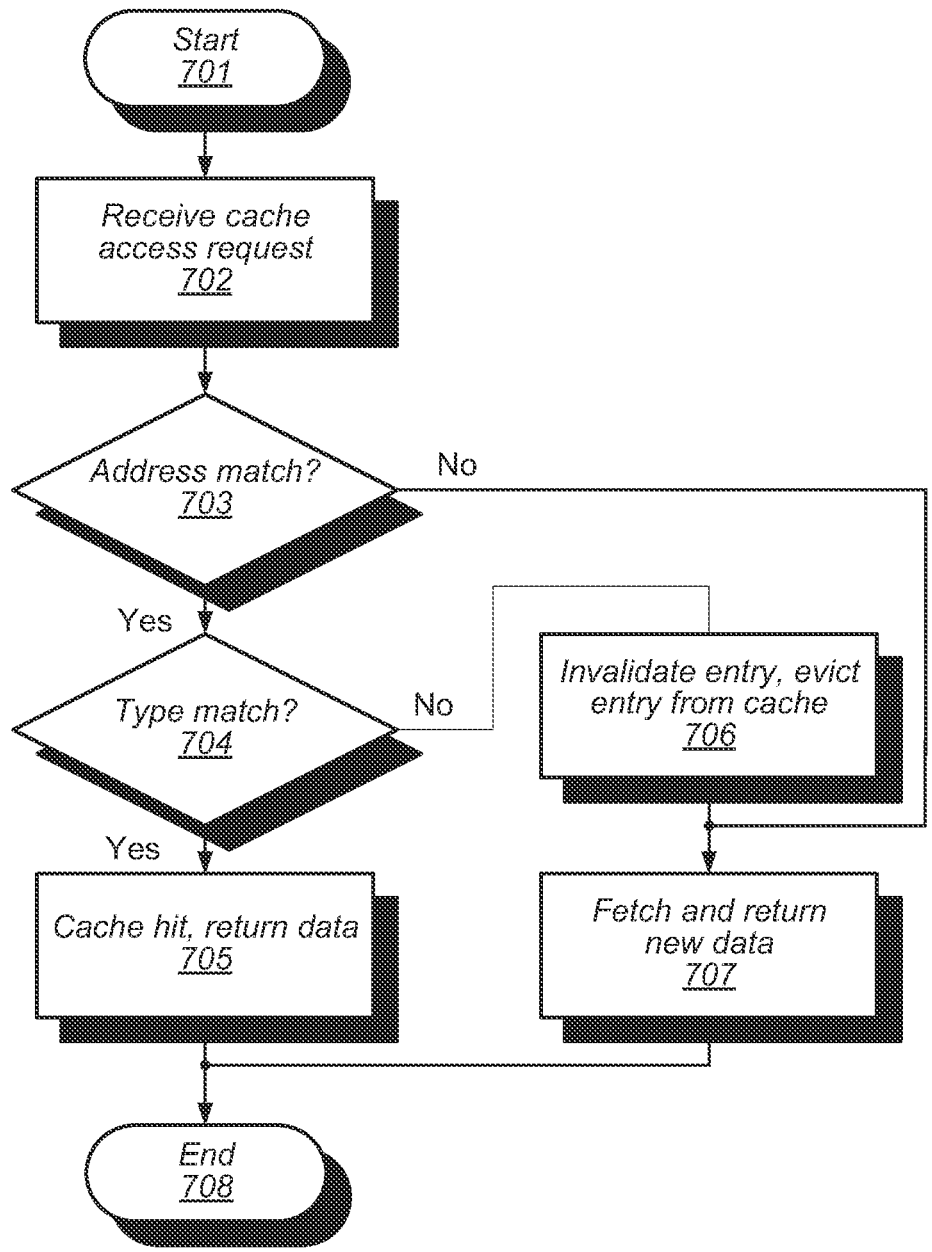
FIG. 7 is a flow diagram illustrating a method for evaluating cache requests.

Turning to FIG. 7, a method is illustrated for handling a modified instruction within a shared cache, such as, e.g., cache 400 in FIG. 4. Referring collectively to processor 600 in FIG. 6 and the flowchart in FIG. 7, the method may begin in block 701. L2 cache 620a may receive an access request in block 702. The request may come from one of cores 601a-h. In other embodiments, the request may come from one of L1 caches 602a-h.

L2 cache 620a may determine if address of the request matches the address tag of an existing cache line (block 703). If no matching address tag exists, the method may move to block 707 to fetch the data from a higher-level cache. If a matching address tag is found in an existing cache line, the method may move to block 704.

L2 cache 620a may then determine if a data type tag matches the type of access being requested (block 704). If the access type matches the type tag of the identified cache line, then the cache access may be considered a hit and move to block 705. Otherwise, the cache access may be considered a miss and the method may move to block 706, where the identified cache line may be invalidated.

If the cache access request is determined to be a hit, L2 cache 620a may read the data from the identified cache line and return it to the requestor. In some embodiments, a cache tag associated with the identified cache line may include one or more bits to indicate if the cache line has been requested recently, in which case these bits would be set to indicate a recent access. In other embodiments, the tag may include bits to count the number of times the cache line has been accessed, in which case this count would be incremented. The method may then end in block 708.

If the data type did not match in block 704, then L2 cache 620a may invalidate the identified cache line (block 706). Invalidating the cache line may include simply clearing a valid bit in the tag to indicate the cache line is invalid and may be replaced when a new entry requires the space. In other embodiments, the identified cache line may be evicted. After invalidating the cache line, the method may move to block 707 to retrieve the requested data.

L2 cache 620a may send a request to the next higher cache to retrieve the requested data (block 707). In some embodiments, the next higher cache may be L3 cache 630. Upon receiving the requested data, either from L3 cache 630 if the request is determined to be a hit or from memory controller 640 if the L3 cache request is determined to be a miss, L2 cache 620a may create a new local entry in an empty or invalidated cache and return the retrieved value to the requestor.

If the request to L3 cache 630 is a hit, L3 cache 630 may expect L2 cache 620a to already have the requested cache line since the original request did match the cache line's tagged address. A circular reference may occur in which L2 cache 620a repeatedly requests the identified cache line from L3 cache 630 and L3 cache 630 continually responds that L2 cache 620a already has the identified cache line. In such an embodiment, to avoid a circular request-response loop, L2 cache 620a may evict the cache line upon detecting the type mismatch and L2 cache 620a may send the eviction notice to L3 cache 630, thus preventing a circular loop scenario. L2 cache 620a may also send the eviction notice to the coupled L1 602 caches. The method may then end in block 708.

It is noted that the method illustrated in FIG. 7 is merely an example embodiment. Although the operations illustrated in method in FIG. 7 are depicted as being performed in a sequential fashion, in other embodiments, some or all of the operations may be performed in parallel or in a different sequence. In some embodiments, additional operations may be included.

Numerous variations and modifications will become apparent to those skilled in the art once the above disclosure is fully appreciated. It is intended that the following claims be interpreted to embrace all such variations and modifications.

What is claimed is:

1. An apparatus, comprising:
 a memory configured to store a plurality of entries, wherein each entry of the plurality of entries includes a data portion and a tag portion, wherein the tag portion includes at least an address tag and a type indicator, wherein the type indicator has a value indicative of a type of data stored in the data portion;
 a control circuit coupled to the memory and to a processor, wherein the control circuit is configured to:
  receive an instruction request, from the processor, for instruction data at a given address within a storage device;
  retrieve, in response to a determination that the instruction data corresponding to the given address is omitted from the plurality of entries, the instruction data from a higher-level memory;
  modify an address value included in the retrieved instruction data for use by the processor;
  store the retrieved instruction data, including the modified address value, in a given entry;
  set the address tag in the tag portion of the given entry to correspond to the given address;
  set the value of the type indicator in the tag portion of the given entry to indicate that instruction-type data is stored in the given entry;
  receive a non-instruction request to retrieve non-instruction data at the given address where the instruction data is currently stored;
  determine that the data corresponding to the given address has been stored in the given entry of the plurality of entries dependent upon the address tag in the tag portion of the given entry; and
  invalidate the given entry in response to a determination that the value of the type indicator in the tag portion of the given entry indicates that instruction-type data is stored in the given entry.

2. The apparatus of claim 1, wherein the control circuit is further configured to:
 retrieve, in response to the non-instruction request, the instruction data from the higher-level memory;
 store the instruction data in the given entry of the plurality of entries in the memory; and
 set the value of the type indicator in the tag portion of the given entry to indicate that the instruction data is stored in the given entry as non-instruction-type data.

3. The apparatus of claim 1 wherein to set the value of the type indicator in the tag portion of the given entry to indicate that instruction-type data is stored in the given entry, the control circuit is further configured to set the value of the type indicator to indicate that modified instruction data is stored in the given entry of the plurality of entries, wherein the value of the type indicator that indicates modified instruction-type data is different than a value of the type indicator that indicates unmodified instruction-type data.

4. The apparatus of claim 1, wherein to invalidate the given entry of the plurality of entries in the memory, the control circuit is further configured to evict data from the given entry of the plurality of entries in the memory.

5. The apparatus of claim 4, wherein the control circuit is further configured to send an eviction notice to the higher-level memory responsive to evicting the data from the given entry of the plurality of entries in the memory.

6. The apparatus of claim 4, wherein a plurality of processors are coupled to the memory and wherein the control circuit is further configured to send an eviction notice to the plurality of processors responsive to evicting the data from the given entry of the plurality of entries in the memory.

7. The apparatus of claim 6, wherein each processor of the plurality of processors includes one or more first fetch units and one or more second fetch units, wherein the one or more first fetch units are configured to retrieve instruction type data from the memory, and the one or more second fetch units are configured to retrieve data memory references from the memory.

8. A method for operating a computing system, comprising:
  receiving an instruction request to retrieve instruction data at a given address from a system memory;
  retrieving, in response to determining that the instruction data corresponding to the given address is omitted from a cache memory, the instruction data at the given address from a higher-level memory;
  modifying an address value included in the retrieved instruction data for use by a processor;
  storing the retrieved instruction data, including the modified address value, in a given cache line of a plurality of cache lines;
  setting an address tag associated with the given entry to correspond to the given address;
  setting at least one type bit associated with the given cache line of the plurality of cache lines to indicate that instruction-type data is stored in the given cache line of the plurality of cache lines;
  receiving a non-instruction request to retrieve non-instruction data at the given address where the instruction data is currently stored;
  determining that the instruction data corresponding to the given address is stored in the given cache line in the cache memory dependent upon the address tag associated with the given entry;
  invalidating the given cache line of the plurality of cache lines in response to a determination that the at least one type bit associated with the given cache line indicates that instruction-type data is stored in the given cache line.

9. The method of claim 8, further comprising:
  retrieving, in response to the non-instruction request, the instruction data from the higher-level memory;
  storing the instruction data in the given cache line of the plurality of cache lines;
  setting the at least one type bit associated with the given cache line of the plurality of cache lines to indicate that the instruction data is stored in the given cache line of the plurality of cache lines as non-instruction-type data.

10. The method of claim 8, wherein setting the at least one type bit associated with the given cache line of the plurality of cache lines to indicate that instruction-type data is stored in the given cache line of the plurality of cache lines further comprises setting the at least one type bit to indicate that modified instruction-type data is stored in the given cache line of the plurality of cache lines, wherein the value of the at least one type bit that indicates modified instruction-type data is different than a value of the at least one type bit that indicates unmodified instruction-type data.

11. The method of claim 8, wherein invalidating the given cache line of the plurality of cache lines further comprises evicting the data from the given cache line of the plurality of cache lines.

12. The method of claim 11, further comprising sending an eviction notice to the higher-level memory in response to evicting the data from the given cache line of the plurality of cache lines.

13. The method of claim 12, further comprising sending an eviction notice to a plurality of processors in response to evicting the data from the given cache line of the plurality of cache lines.

14. A system, comprising:
  a higher-level memory configured to store program instructions and data;
  a cache memory coupled to the higher-level memory, wherein the cache memory is configured to store a plurality of cache lines, wherein each cache line of the plurality of cache lines is configured to store program instructions and non-instruction data, and wherein each cache line includes at least an address tag and a data-type tag, wherein each data-type tag stores a value indicative of a type of data stored in the corresponding cache line; and
  one or more processor cores coupled to the cache memory, wherein the one or more processor cores are each configured to request program instructions and non-instruction data from the cache memory;
  wherein the cache memory is further configured to:
    receive an instruction request from one of the one or more processor cores for instruction data at a given address;
    retrieve, in response to a determination that the instruction data corresponding to the given address is excluded from the plurality of cache lines, the instruction data at the given address from the higher-level memory;
    modify an address value included in the retrieved instruction data for use by the one or more processor cores;
    store the received instruction data, including the modified address value, in a given cache line of the plurality of cache lines;
    set the value of the data type tag corresponding to the given cache line of the plurality of cache lines to indicate that instruction-type data is stored in the given cache line;
    receive a non-instruction request to retrieve non-instruction data at the given address where the instruction data is currently stored;
    determine that the instruction data corresponding to the given address has been stored in the given cache line of the cache memory dependent upon the address tag;
    invalidate the given cache line in response to a determination that the value of the corresponding data type tag indicates that instruction-type data is stored in the given cache line.

15. The system of claim 14, wherein the cache memory is further configured to:
  retrieve, in response to the non-instruction request, the instruction data from the higher-level memory;

store the instruction data in the given cache line of the plurality of cache lines; and set the value of the data type tag corresponding to the given cache line to indicate that the instruction data is stored in the given entry as non-instruction-type data.

16. The system of claim 14, wherein to set the value of the data type tag corresponding to the given cache line of the plurality of cache lines to indicate that instruction-type data is stored in the given cache line, the cache memory is further configured to set the value of the data type tag to indicate that modified instruction-type data is stored in the given cache line, wherein the value of the data type tag that indicates modified instruction-type data is different than a value of the data type tag that indicates unmodified instruction-type data.

17. The system of claim 14, wherein to invalidate the given cache line of the plurality of cache lines, the cache memory is further configured to evict the data from the given cache line of the plurality of cache lines.

18. The system of claim 17, wherein the cache memory is further configured to send an eviction notice to the higher-level memory responsive to evicting the data from the given cache line of the plurality of cache lines.

19. The system of claim 17, wherein the cache memory is further configured to send an eviction notice to the one or more processor cores responsive to evicting the data from the given cache line of the plurality of cache lines.

20. The system of claim 14, wherein each one of the one or more processor cores includes one or more first fetch units and one or more second fetch units, wherein the one or more first fetch units are configured to retrieve program instruction data from the cache memory, and wherein the one or more second fetch units are configured to retrieve non-instruction data from the cache memory.

* * * * *